United States Patent
Candella et al.

(10) Patent No.: US 8,073,785 B1
(45) Date of Patent: Dec. 6, 2011

(54) METHOD AND SYSTEM FOR DETECTING FRAUD IN NON-PERSONAL TRANSACTIONS

(76) Inventors: George J. Candella, Somers, NY (US); Irene H. Nohavec, Clifton, NJ (US); Michael L. Scruggs, Argyle, TX (US)

(*) Notice: Subject to any disclaimer, the term of this patent is extended or adjusted under 35 U.S.C. 154(b) by 2207 days.

(21) Appl. No.: 09/710,776

(22) Filed: Nov. 9, 2000

(51) Int. Cl.
 *G06Q 20/00* (2006.01)
(52) U.S. Cl. ............................... 705/75; 705/76
(58) Field of Classification Search .......... 705/10, 705/1, 14, 2, 26, 6, 27, 37, 44, 400, 75, 76, 705/64; 707/6, 104.1
 See application file for complete search history.

(56) References Cited

U.S. PATENT DOCUMENTS

| | | | | |
|---|---|---|---|---|
| 5,884,289 A | * | 3/1999 | Anderson et al. | 705/44 |
| 6,029,150 A | * | 2/2000 | Kravitz | 705/39 |
| 6,122,624 A | * | 9/2000 | Tetro et al. | 705/44 |
| 6,163,771 A | * | 12/2000 | Walker et al. | 705/18 |

* cited by examiner

*Primary Examiner* — Pierre E Elisca
(74) *Attorney, Agent, or Firm* — Rudoler & DeRosa LLC (57) ABSTRACT

A method and system us disclosed for detecting fraud is non-personal transactions. The method and system comprise transmitting the purchaser's data, includes a ship-to address for the transaction, to a fraud-detection system; processing the purchaser's data to determine whether the transaction is potentially fraudulent; and returning the relative risks of fraudulent activity associated with the transaction. The method and system may include any of the following additional steps: checking to determine whether the purchaser's ship-to address exists, checking the purchaser's ship-to address against an historical database to determine whether a prior history of fraud exists, checking the purchaser's ship-to address against an historical database to determine whether a pattern of fraudulent activity exists for the ship-to address; and checking the purchaser's ship-to address against a modeling engine to determine whether elements exist in the demographic data which correlate with fraudulent trends. In addition, a score may be calculated based at least in part upon the likelihood that the transaction is fraudulent.

30 Claims, 9 Drawing Sheets

METHOD AND SYSTEM FOR DETECTING FRAUD IN NON-PERSONAL TRANSACTIONS

FIELD OF THE INVENTION

The present invention relates to a method and system for detecting fraud in non-personal commerce transactions and reducing the risk and loss associated therewith.

BACKGROUND OF THE INVENTION

Today, electronic commerce encompasses a broad range of order and delivery channels such as the Internet, telephone, catalogue, and fax, to name the most visible. In addition to being homogeneous due to their electronic order, entry, and delivery means, these channels share a characteristic of non-personal payment or payee-not-present. That is, the electronic merchants and direct marketeers must accept electronic payments without being able to personally verify the purchaser's identity. As a consequence, one of the most serious problems facing electronic commerce today is the risk of transaction fraud when the consumer and merchant do not meet face-to-face.

Fraud can be divided both into merchant fraud (where a merchant defrauds a consumer) and consumer fraud, whereby a transaction is conducted by a consumer using a fraudulent credit card account or by a consumer misrepresenting himself in a transaction. Consumer fraud costs electronic merchants and direct marketeers today between 5% and 7% of their sales.

Presently, there are a number of companies who are in the business of limiting credit card fraud. Each of these companies utilizes a method of exposing the fraudulent transaction by determining that it does not follow a predictable experience in the usage of a particular credit card (i.e., within a geographic location, from one of a group of vendors, for a particular type of merchandise or service, etc.). Using these existing methods, the merchant is typically only notified when there is a deviation from a predictable credit card pattern.

It is fundamental to understand that for non-personal transactions, such as on-line or direct marketing transactions, since there can be no signature confirmation, the merchant accepts all of the risk that the transaction is fraudulent in the event that the credit card holder denies the charge. A transaction can be voided simply by the denial of a cardholder, and the merchant will have funds deducted by the transaction processor (netted from future payments), and the merchant will incur a charge-back cost.

For example, for an electronic transaction processed over the Internet, merchants have to contract with a transaction processor. Transactions can either be processed via a direct interface with the merchant, whereby the merchant directly captures information on the customer, the card numbers, the "ship-to" address, etc. or via a "gateway" company which outsources key features of the transaction processing and data capture.

The electronic merchant receives an order from the person who gives a name, credit card number, and expiration date to the retailer in connection with a purchase. The purchaser directs that the merchandise be delivered to an address which is different than the credit card billing address. Using traditional methods, the merchant receives a credit card approval number from its gateway and ships the merchandise to the shipping address.

If, in fact, the credit card number has been stolen and the transaction is fraudulent, the true cardholder will likely reject the invoice when he is billed for it, claiming fraud. Since the credit card company had confirmed the validity of the card (which remains in the owner's possession), and because the transaction is "card not present," i.e., was not involved with a signature verification, the credit card company has no liability. Assuming the cardholder refuses to pay the credit card company, the credit company will issue a charge back against the retailer, which has no recourse. As a result, the merchant loses the value of the merchandise, the shipping charge, the original transaction costs, and the transaction cost on the charge back with its payment processor. Such losses could be significant if the rate of fraudulent activity for these non-personal transactions is high.

Thus, there exists a need for a system and method for detecting fraudulent transactions in non-personal commerce transactions and reducing the risk and loss associated therewith.

SUMMARY OF THE INVENTION

A method and system us disclosed for detecting fraud is non-personal transactions. The method and system comprise transmitting the purchaser's data, includes a ship-to address for the transaction, to a fraud-detection system; processing the purchaser's data to determine whether the transaction is potentially fraudulent; and returning the relative risks of fraudulent activity associated with the transaction. The method and system may include any of the following additional steps: checking to determine whether the purchaser's ship-to address exists, checking the purchaser's ship-to address against an historical database to determine whether a prior history of fraud exists, checking the purchaser's ship-to address against an historical database to determine whether a pattern of fraudulent activity exists for the ship-to address; and checking the purchaser's ship-to address against a modeling engine to determine whether elements exist in the demographic data which correlate with fraudulent trends. In addition, a score may be calculated based at least in part upon the likelihood that the transaction is fraudulent.

The processing step, in certain forms of the invention, comprises parsing out the purchaser's ship-to address, checking to determine whether the purchaser's ship-to address exists, comparing a zip code or ZIP+4 of the ship-to address against a post office database, checking the area code of the purchaser's phone number to determine whether it fits the geographic area of the ship-to address, comparing the purchaser's ship-to address against the national change of address service database or the publisher's change of address database, and/or rating the building site associated with the "ship-to" address to determine whether the building or lot type is inconsistent with the transaction data.

The prior history of fraud determining step, in certain forms of the invention, comprises checking whether a record associated with the purchaser's ship-to address exists in the historical fraud database. In addition, the associated record can be checked to determine whether negative data is associated with the ship-to address.

The pattern of fraud detecting step, in certain forms of the invention, comprises determining whether an overlapping use of payment means and ship-to address is present by consulting a database of prior transactions and/or retroactively notifying the merchant of previous transactions associated with the ship-to address once a pattern of fraudulent activity has been detected.

BRIEF DESCRIPTION OF THE DRAWINGS

For the purpose of illustrating the invention, there is shown in the drawings a form which is presently preferred; it being

FIGS. 4 (*a*) and 4 (*b*) are flow charts showing the address tracking procedure of the fraud-detection method of the present invention.

FIGS. 5 (*a*) and 5 (*b*) are flow charts of the address tracking procedure for determining prior fraudulent activity of the present invention.

DESCRIPTION OF THE PREFERRED EMBODIMENT

Figure 1:
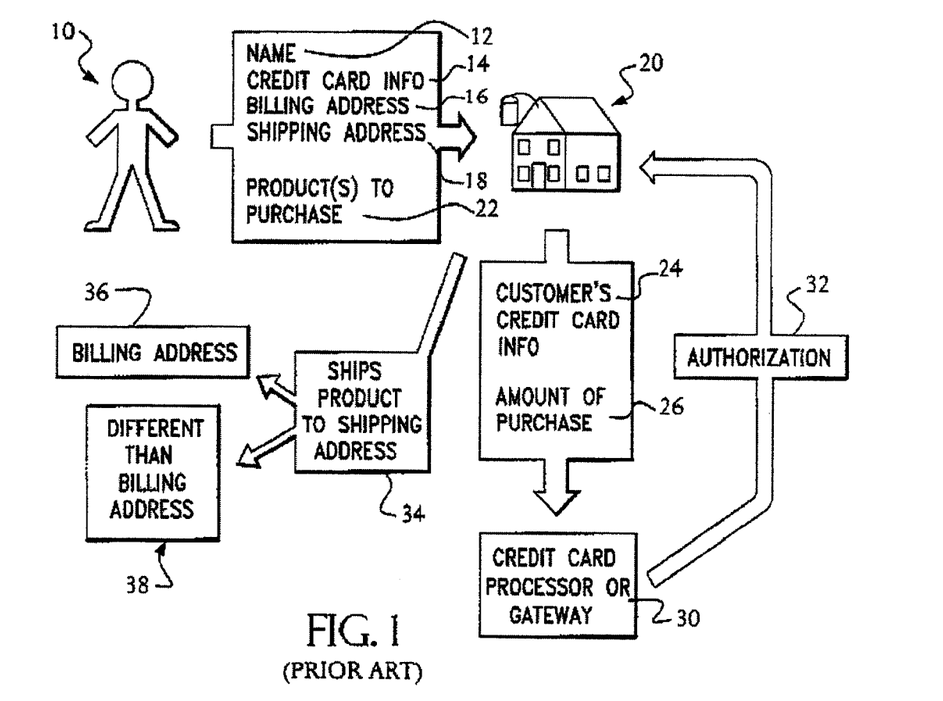
FIG. 1 is a schematic drawing of a typical non-personal commerce transaction.

In FIG. 1 there is shown a typically non-personal commerce transaction between a purchaser 10 and a merchant of goods or services 20. Purchaser 10 initiates a transaction from a remote location such as via the Internet, telephone, mail or fax. All of these methods of commerce share the same characteristics of an electronic or paper-based order-entry system, i.e. a method of delivery which is electronic or via parcel post and non-personal payment.

The purchaser 10 selects product(s) 22 to purchase from the merchant 20 and transmits his name 12, payment information 14, billing address 16, and shipping address 18 to the merchant 20. The merchant 20 transmits the purchaser's payment information 24 and the amount of the purchase 26 to its payment processor or gateway 30. The payment processor or gateway 30 processes the payment information such as credit card information with the credit card issuer's bank and indicates whether the transaction has been authorized 32 by the issuing bank. Once the merchant 20 receives the authorization 32 from the payment processor 30, it will typically ship the purchased products 22 to the shipping address 18 given by the purchaser 10 as shown in box 34. This shipping address may be the same as the credit card's billing address 36 or may be different than the credit card's billing address 38.

Many conventional systems exist for checking whether the shipping address is the same as the credit card billing address, thus indicating a low risk of fraud. However, where the billing address is different than the shipping address 38 there exists no way for the merchant 20 to personally verify the purchaser's 10 identity.

Figure 2:
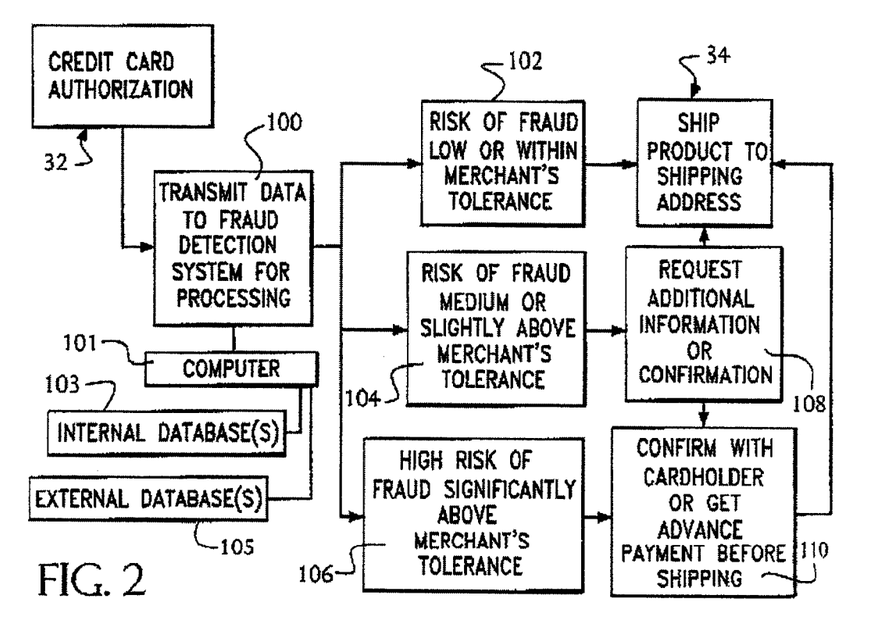
FIG. 2 is a schematic drawing of the method and system of detecting fraud in accordance with the present invention.

In FIG. 2 there is shown a method and system for detecting whether a non-personal commerce transaction is fraudulent or is highly risky or susceptible to fraud when the shipping address given by the purchaser is different than the billing address of the credit card used for the purpose. As shown in FIG. 2(*a*), once the merchant receives the credit card authorization 32 from the credit card processor 30, the merchant will transmit the purchaser's data to the fraud-detection system for processing 100, as described in greater detail below.

The fraud-detection system 100 utilizes a computer 101 to process the data obtained by consulting internal databases 103 and external databases 105 (if necessary) to determine whether the transaction is fraudulent or potentially fraudulent. The system 100 analyzes the transaction to characterize, by point of delivery and various other factors, transactions that are likely to be legitimate and to separate them from transactions known or likely to be fraudulent. For example, if a merchant database reveals that there have been one or more deliveries to a specified address without objection by the cardholder, it is almost certain that further deliveries to that address (particularly if it matches the cardholder's address) are legitimate. If, however, a delivery is directed to an address inconsistent with the existing pattern associated with that critical purchase, it will trigger an alert that the transaction may be fraudulent. In such an event, the merchant will telephone or use the "safe-call" call verification program to communicate with the card owner to get confirmation of the bona fides of the transaction.

To this end, the fraud-detection system 100 will return to the merchant 20 the associated risks of the present transaction. As shown in FIG. 2, when the fraud-detection system determines that the risk of fraud is low or within the merchant's tolerance 102, the merchant will know that it may safely ship the product to the shipping address 18 given by the purchaser 10. If, however, the system indicates that the risk of fraudulent activity is medium or slightly above the merchant's tolerance level 104, the merchant 20 has the option of requesting additional information or confirmation 108 before shipping the product to the shipping address 34. Lastly, if the system 100 indicates that there is a high risk of fraudulent activity which is significantly above the merchant's tolerance level 106, the merchant can confirm with the cardholder or otherwise get advance payment from the purchaser 110 before shipping the product to the shipping address 34.

Figure 3:
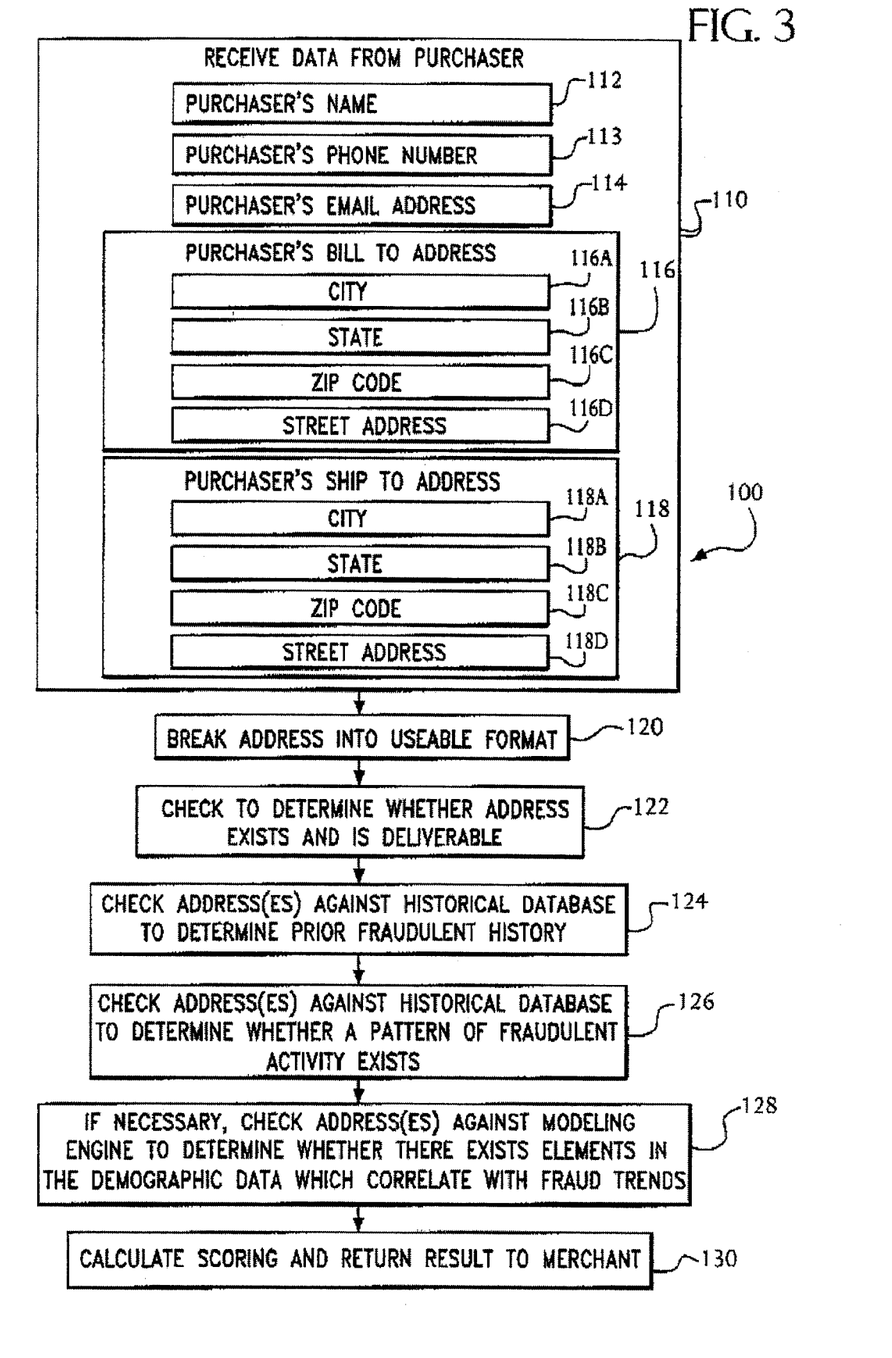
FIG. 3 is a schematic drawing of a flow chart in accordance with the fraud-detection system illustrated of FIG. 2.

As shown in FIG. 3, the fraud-detection system and method of the present invention 100 comprises the steps of receiving data from the purchaser 110, and breaking the"bill-to" address and "ship-to" address into a usable format 120. The system next checks to determine whether the shipping address exists and is deliverable 122 by checking the address (es) against a historical database to determine whether a prior fraudulent history exists 124. Next, the system checks the address(es) against a historical database to determine whether a pattern of fraudulent activity exists 126 and, if necessary, checks the address(es) against a modeling engine to determine whether there exists elements in the demographic data which correlate with fraud trends 128. Finally, the system calculates the scoring and returns the results to the merchant 130.

Address Processing Step

Still referring to FIG. 3, the fraud-detection method and system 100 receives the following data from purchaser 10: the purchaser's name 112, the purchaser's telephone number 113, the purchaser's e-mail address 114, the purchaser's bill-to address 116, and the purchaser's ship-to address 118. As shown in Step 110, the purchaser's bill-to address 116 is broken down into a usable format similar to the format used by the Post Office CASS System, i.e., the city 116(*a*), the state 116(*b*), the zip code 116(*c*), and the street address 116(*d*) are parsed out of the purchaser's bill-to address 116. This allows the system's computer 101 to easily match the address data against the system's databases 103 and 105. Similarly, the purchaser's ship-to address 118 is broken into the city 118(*a*), state 118(*b*), zip code 118(*c*), and street address 118(*d*).

Address Reasonableness and Existence Checking Step

Figure 4A:
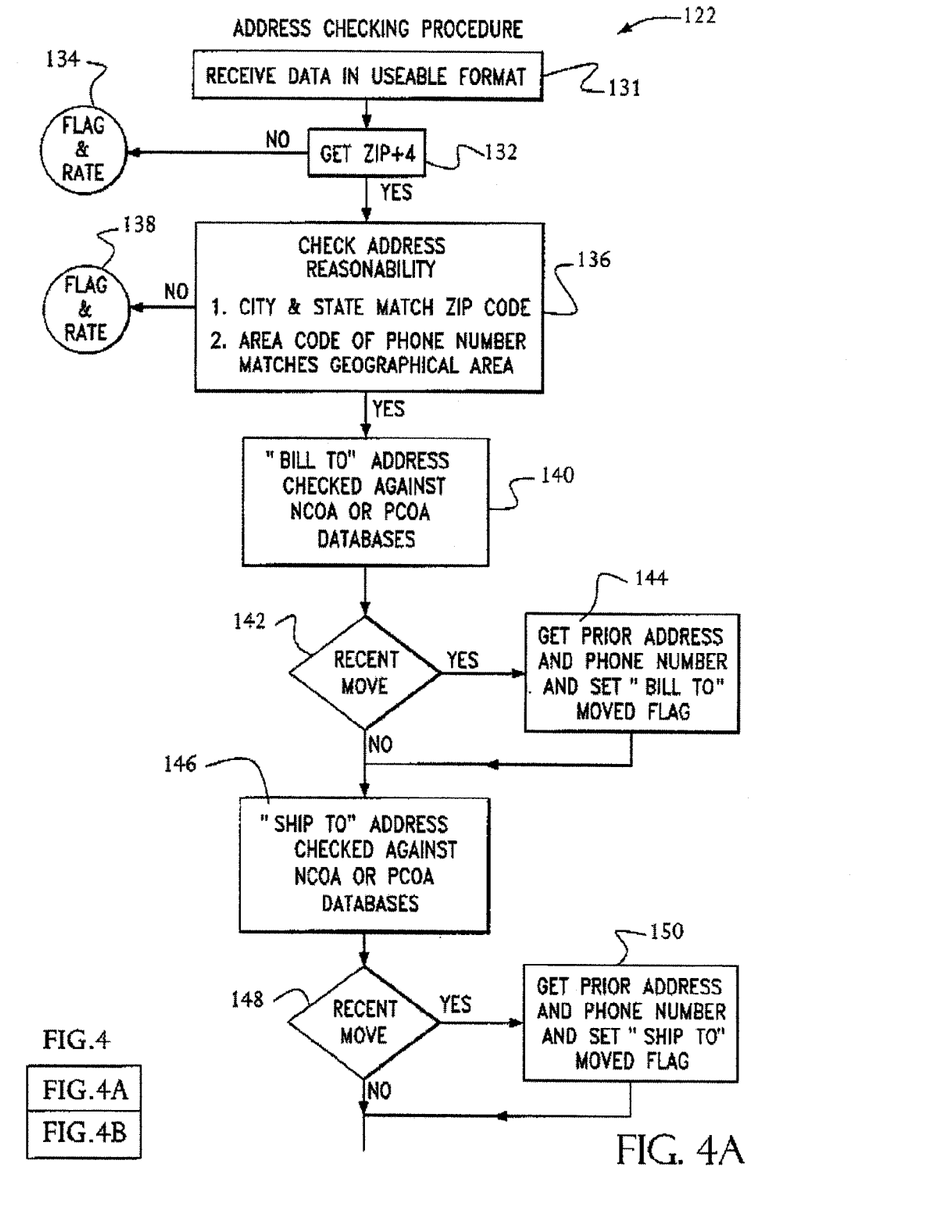

The method and system for detecting fraud 100 is now able to process the purchaser's data to determine whether the transaction is potentially fraudulent. As shown in FIG. 4, the address-checking procedure 122 receives the data in a usable format 131. An internal Post Office database is checked 132 to determine the existence of the address and the associated nine digit zip (i.e., ZIP+4). The use of the ZIP+4 code permits appropriate identification of high fraud delivery points, since each nine ZIP+4 code includes only a relatively small number of households (typically 400-500 households). If the system is unable to establish the existence of the ZIP+4, a flag is set 134 to indicate this.

Once the ZIP+4 is established, the system next checks to determine whether the address is reasonable. An address is deemed to be reasonable when the city and state of the shipping address matched the ZIP+4 and whether the area code of the purchaser's telephone number 113 geographically fits the general geographic area of the purchaser's ship-to address 118. If the address is determined not to be reasonable, a flag 138 is set to indicate this.

Once the address is determined to be reasonable, the purchaser's "bill-to" address 116 is compared to the National Change of Address Service ("NCOA") database which is provided by the U.S. Post Office or the publisher's change of address database ("PCOA") which is available from various publishers of magazine, journals, periodicals, and the like 140. If the NCOA or PCOA indicate a recent move 142 associated with the purchaser's "ship-to" address 118, the system obtains the prior address and telephone number from either the NCOA or PCOA 144. In addition, a "bill-to moved" flag is set to indicate this.

If a recent move 142 is not indicated or once the prior "bill-to" moved to address is obtained, the purchaser's "ship-to" address 118 is next checked against the NCOA and/or PCOA databases 146. As with the "bill-to" checking procedure 140, the system determines whether the NCOA and/or the PCOA databases indicate that there has been a recent move 148 associated with the purchaser's "ship-to" address. If so, the system gets the prior "ship-to" address and telephone number and sets the "ship-to moved" flag 150.

Figure 4B:
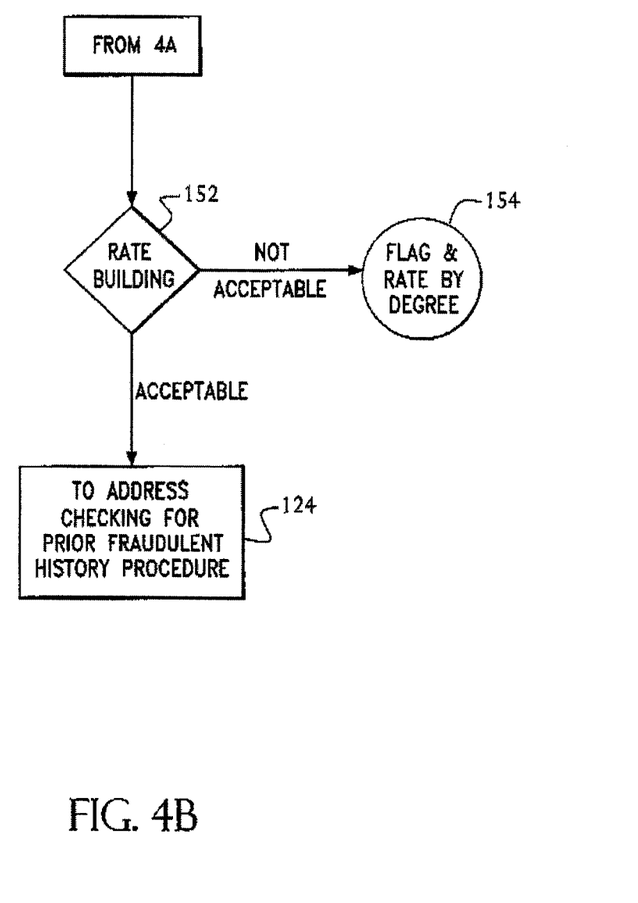

Referring now to FIG. 4(b), if no recent move 148 is indicated or once the prior address and telephone number have been obtained from the NCOA/PCOA databases, the actual building site of the "ship-to" address 118 is rated 152 by determining the building or lot type from the NCOA database. The system can determine from the information received from the NCOA database whether the building or lot is a vacant lot, cemetery, dorm building, apartment building, a multi-family house, a single-family house, a commercial office, a warehouse, is undeliverable, or the like. If the system determines that the building or lot type is inconsistent with the purchaser's data, such as if the "ship-to" address indicates a vacant lot or cemetery or if a real person is the purchaser, yet a loading dock-type address was indicated. As a further example, certain types of buildings, such as bars, mail delivery aggregators and the like, historically have had high fraud rates, whereas other types, such as private homes, apartment buildings and commercial office buildings have not.

If the building is rated as a non-acceptable based on a historical pre-selected set of criteria, a flag 154 is set to indicate such. If the building is determined to be acceptable 152, the address check against prior fraudulent history step 124 can commence. In this way, the system determines whether the actual "ship-to" address 118 actually exists and is deliverable.

Determining Prior Fraudulent History Step

Figures 5, 5A:
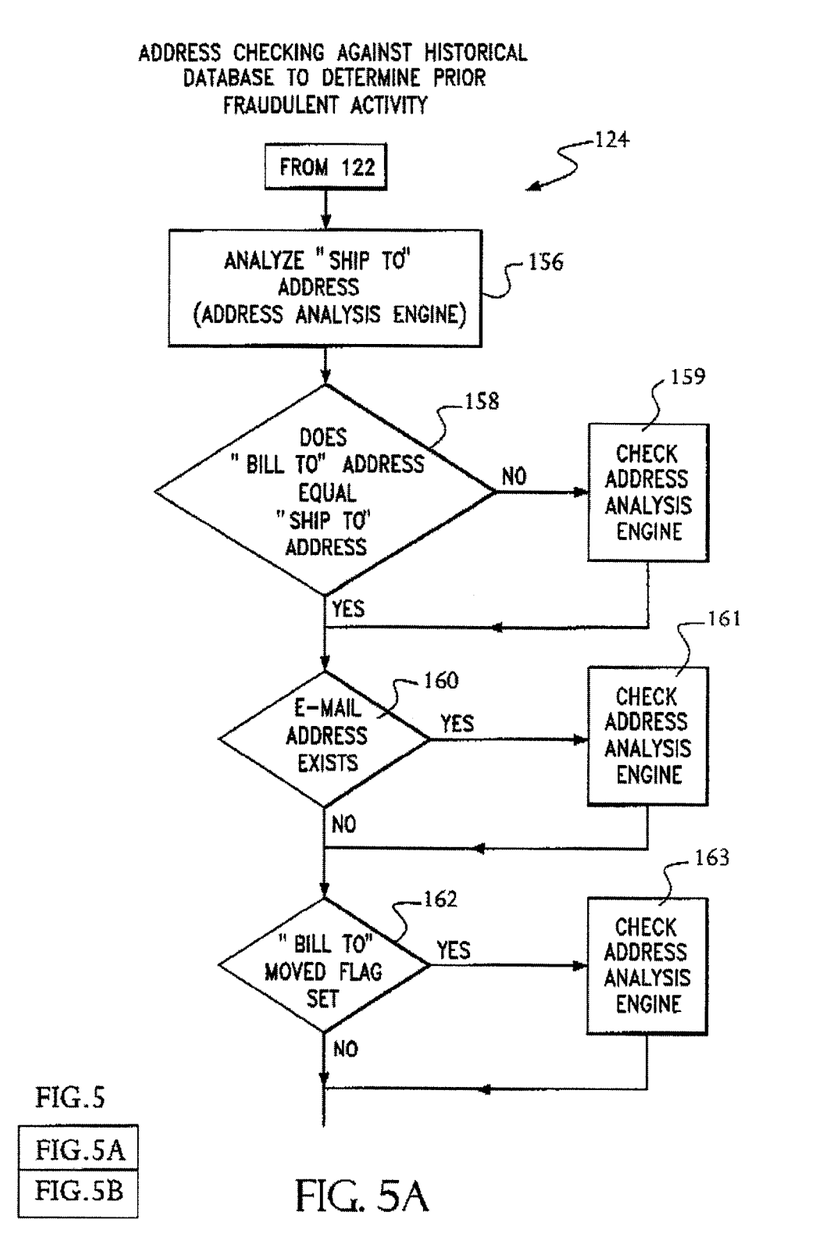
Figure 6:
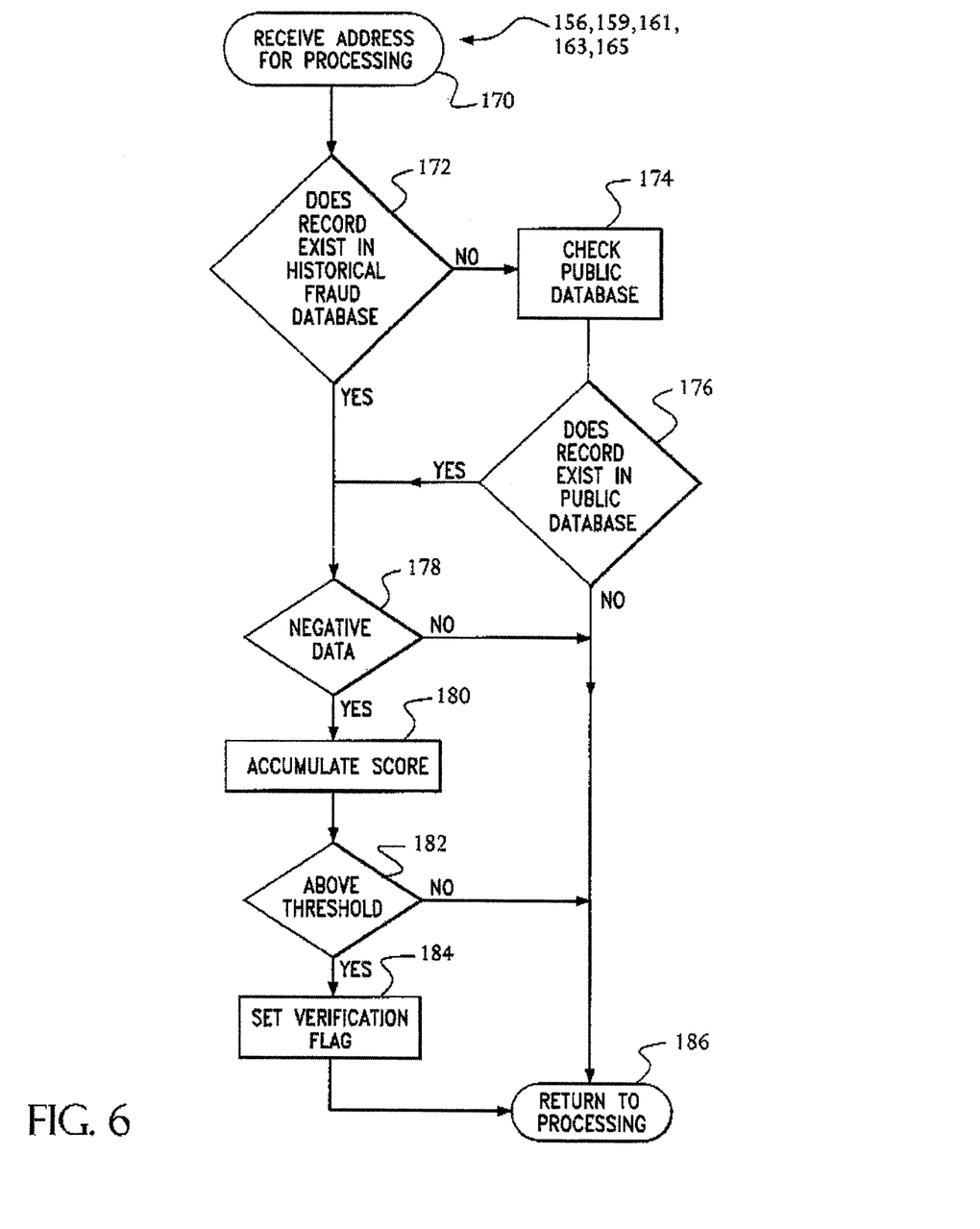
FIG. 6 is a flow chart of the address analysis engine of the present invention.

After it is determined whether the address exists and is deliverable 122, the pertinent addresses are checked against an historical database to determine whether prior fraudulent activity exists 124 for the address(es). As best seen in FIG. 5, step 124 begins by analyzing 156 the purchaser's "ship-to" address 118. Next, the purchaser's "bill-to" address 116, if different than the "ship-to" address 118, is analyzed 158. In addition, the purchaser's e-mail address 114, the previous address associated with the purchaser's "bill-to" address 116 is analyzed 162, if the bill-to move flag 144 is set, and the address associated with the purchaser's previous "ship-to" address 116 is analyzed 164 if the "ship-to" move flag 150 has been set are also analyzed. As best seen in FIG. 6, an address analysis engine or subroutine is called to perform these analyses.

The address analysis engine 156, 159, 161, 163, and 165 operates as follows. The analysis engine receives an address for processing 170. The engine checks to determine whether a record associated with the address exists 172 in the historical fraud database. The historical database comprises standardized addresses known to have been involved in the receipt of shipments known to be fraudulent. If a record does not exist, other public databases of historical fraud information is checked to determine whether a record for the address exists 174. If a record exists in the public database 176 or if a record exists in the historical fraud database 172, the corresponding record is checked to determine whether negative data 178 is associated with this address.

For example, if a merchant previously reported a fraudulent transaction at this address, negative data would be indicated by the database. If a record does not exist in the internal historical database 172 or the public database 176, or if no negative data 178 was found, the subroutine is terminated and returns to processing 186. If negative data 178 is received, a score is calculated based upon a pre-selected criteria 180.

The pre-selected criteria is preferably based upon an artificial intelligence evaluation of historical results based on factors established to be significant, such as order merchandise type, shipping nine digit zip code, time of order, distance from buyer to shipping point, and the like. If the score 180 is above a threshold 182 set by the merchant, a verification flag 184 is set and the subroutine is terminated and returns to processing 186. If the accumulated score 180 is not above the merchant's threshold, the verification flag is not set and the subroutine again terminates and returns to processing 186.

Referring back to FIG. 5, once the purchaser's "ship-to" address 116 has been analyzed 156 by the address analysis engine 156, the procedure determines whether the "bill-to" address is the same as the "ship-to" address, as in step 158. If the "bill-to" address 116 is different, the address analysis engine 159 is again called to determine whether negative data is associated with this address. Once the "ship-to" address, and, if necessary the "bill-to" address, have been analyzed, the purchaser's e-mail address 114 is checked 160. If the purchaser's e-mail address 114 has been given, it is checked by the address analysis engine 161 to determine whether a negative data is associated with it.

Figure 5B:
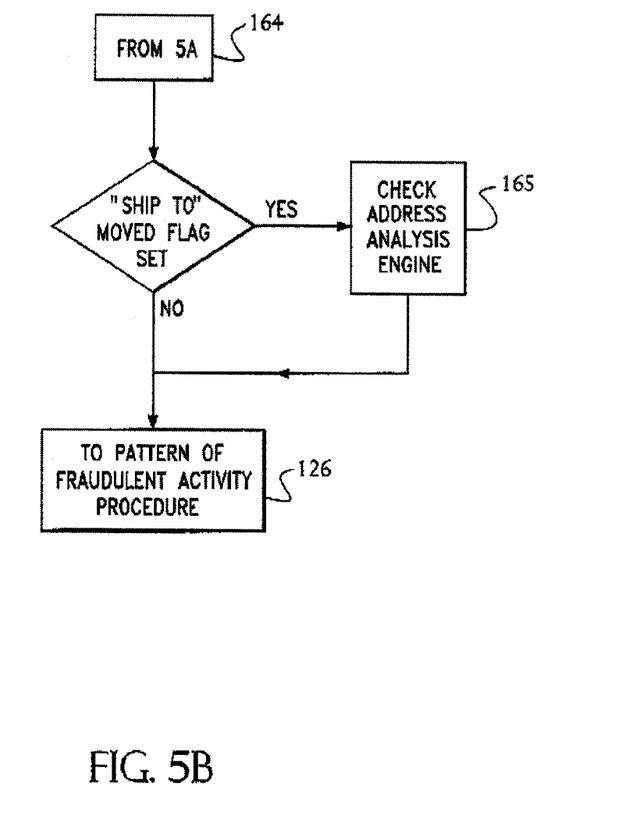

Once the e-mail address has been check or if no e-mail address was given, the system determines whether the "bill-to moved" flag 162 has been set. Such would be the case if the NCOA/PCOA database indicated a recent move.

If the "bill-to moved" flag has been set, the address analysis engine 163 is again checked to determine whether negative data is associated with it. Similarly, the address analysis engine 165 would be used to determine whether negative data is associated with the previous "ship-to" address, if the "ship-to moved" flag has been set 164. Once all of these addresses have been checked, the system would know whether any negative data is associated with 1) any of the addresses given by the purchaser and 2) any of the previous addresses associated with any of the addresses given by the purchaser, if a recent move is indicated by the NCOA/PCOA database. The pattern of fraudulent activity procedure 126 is next called on to determine whether the transaction is potentially fraudulent based upon the existence of a pattern of fraudulent activity at the given address(es).

Pattern of Fraudulent Activity, Checking Procedure

Figure 7:
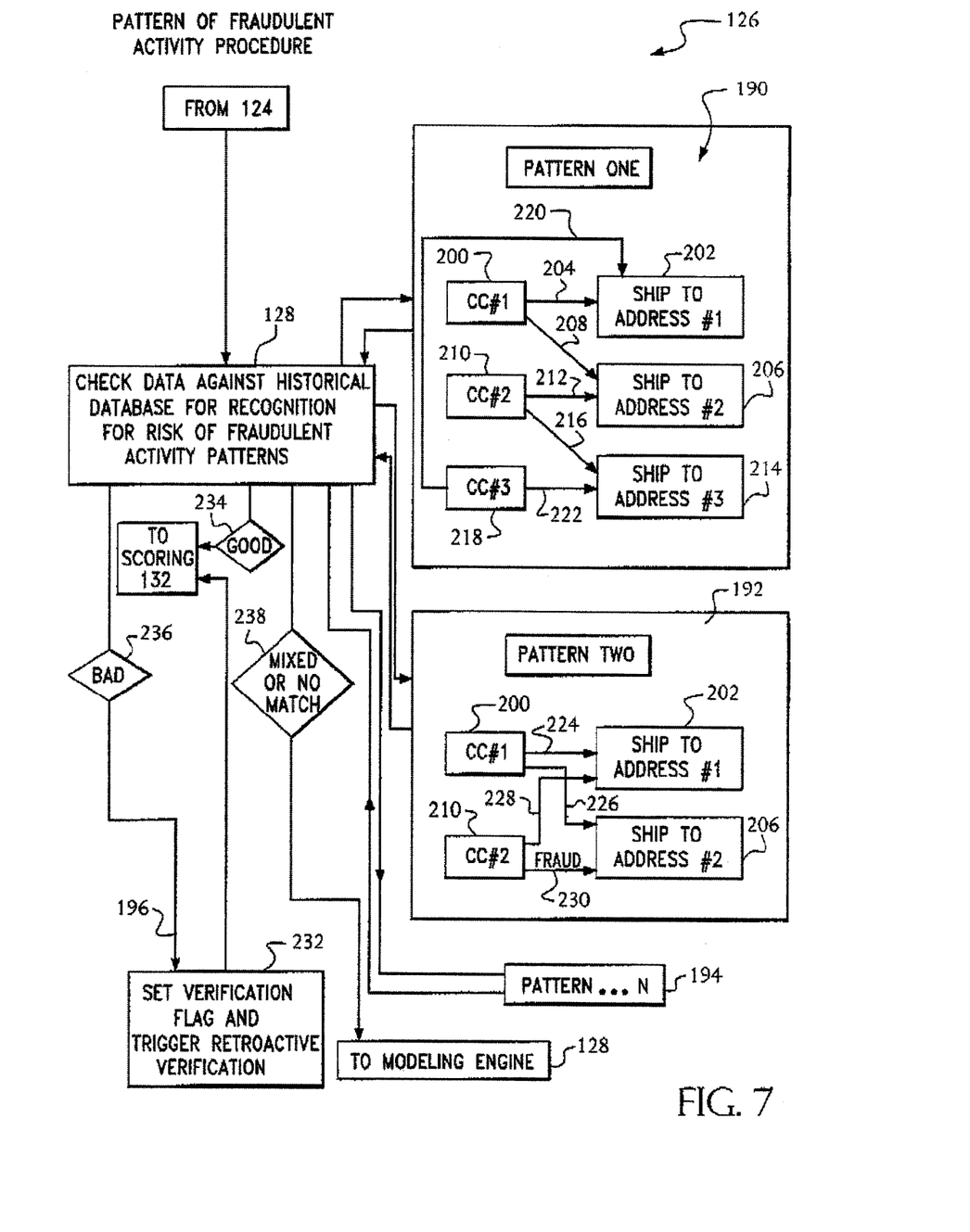
FIG. 7 is a flow chart of the procedure for detecting the existence of a pattern of fraudulent activity in accordance with the present invention.

Once the purchaser's address(es) have been checked for a prior history of fraud associated therewith, the system continues to the fraud pattern detection portion 126 of the procedure to determine whether a pattern of fraudulent activity is discernable from a historical database of transactions.

In today's fast-paced business world, this type of pattern recognition is extremely valuable when no prior history of fraud has been detected and/or when it is too soon for a current or recent fraudulent transaction to have been recorded to the historical databases. It frequently occurs that a purchaser perpetrating a fraudulent transaction is able to obtain a valid credit card and ship thousands of dollars of merchandise to various addresses until the credit card spending limit is reached, before the existing fraud detecting systems are able to detect the fraud. In any event, once the credit limit is reached, the thief will obtain a new credit card and repeat the cycle of fraud. By being able to detect when a pattern of activity has commenced which is highly indicative of fraudulent activity, a merchant may be able to react in time to either cancel the shipment of products obtained via fraud or to confirm the transaction with the cardholder.

As shown in FIG. 7, the transaction is checked against a historical database of transactions to determine whether the fraudulent pattern of activity exists 128. Two such patterns of activity 190 and 192 are shown. It is understood that numerous other patterns of fraudulent activity 194 are known and could be incorporated into the present invention.

In addition, since the shipping address is the primary determinant of risk of fraud, the evaluations and scoring of the method of the present invention is valid for all purchaser-not-present transactions, including those involving credit cards, e-checks, open-accounts, or the like.

One such pattern of fraudulent activity 190 is shown in FIG. 7. Pattern 190 illustrates the case where three separate credit cards are used to ship merchandise to three separate addresses and represents a frequent fraudulent pattern activity which is very difficult, if not impossible, to detect with conventional fraud-detection methods. To illustrate, a purchaser buys merchandise with a first credit card 200 and ships 204 to first address 202 and ships 208 to the second address 206. In addition, a second credit card 210 is used to purchase merchandise which is shipped 212 to the second address 206 and shipped 216 to the third address 214. Finally, a third credit card 218 is used to purchase merchandise which is shipped 220 to the first address 222 and is shipped 222 to the third address 214.

The pattern of fraudulent activity procedure 128 is able to determine when this type of overlapping use of payment means and/or credit cards and shipping addresses are present by consulting a historical database of transactions. It is important to note that the assumption is that none of these transactions are indicated as being fraudulent when the historical database is consulted to determine prior fraudulent history, as in step 124.

The mere fact that a first credit card 202 is linked to a second credit card 210 by one "ship-to" address 206, while a second credit card 210 is linked to a third credit card 218 by a separate "ship-to" address 214, and while the third credit card 218 is then linked back to the first credit card 200 via a third separate "ship-to" address 214 indicates a high risk of potential fraudulent activity. Once the last transaction is recorded in the system's database and the pattern of fraudulent activity is determined by identifying the fraudulent pattern 190, the previous eight transactions which initially were not indicated as being potentially fraudulent, are then updated by the system as described in greater detail below.

A second pattern of fraudulent activity 192 is also illustrated in FIG. 7. In the second pattern 192, a first credit card 200 is used to ship to 224 a first shipping address 202 and to ship to 226 a second shipping address 206. Thereafter, a second credit card 210 is used to ship to 228 the first shipping address 202. It is assumed that none of these transactions as initially revealed to be fraudulent. Next, the second credit card 210 is then used to ship 230 merchandise to the second shipping address 206. This transaction, however, is revealed to be fraudulent when the historical database is checked by the algorithm 124.

Once this transaction is determined to be fraudulent, the system would then go back and search each of the transactions that the second credit card was associated with, along with any of the addresses that link other credit cards to this fraudulent transaction. So, in the illustrated example, the system would notify the merchant that processed the second credit card 210 and shipped merchandise to the first shipping address 202, the merchant that processed first credit card 200 and shipped merchandise to the first shipping address 202, and the merchant that processed the first credit card 200 and shipped merchandise to the second shipping address 206.

It should also be understood that other patterns of fraud 194 can also be incorporated into the present system.

Once the system completes checking all of the patterns 190, 192, and 194, three possible results are returned. If no patterns were matched, a good result 234 is returned by the system and the system moves to processing the scoring portion of the procedure 132. However, if any patterns of fraudulent activity were matched by the system, a negative result 236 or a mixed result 238 result could be returned.

For example, if pattern one 190 or pattern two 192 were detected, it is highly likely that the transaction is potentially fraudulent and a negative result 236 would be returned.

If a negative result 236 is returned, a verification flag 232 is set and a retroactive verification process is triggered. For example, if a pattern of activity involving six separate transactions, such as in pattern one 190, are involved, then each of the previous five transactions would be retroactively changed to potentially fraudulent and the respective merchant who processed the transaction would be notified. Such a retroactive notification would allow the merchant to potentially take remedial action to minimize the loss resulting from the fraudulent transaction. Once the verification flag 232 is set, the procedure then proceeds to the scoring and result-generating phase 132 of the procedure.

Figure 8:
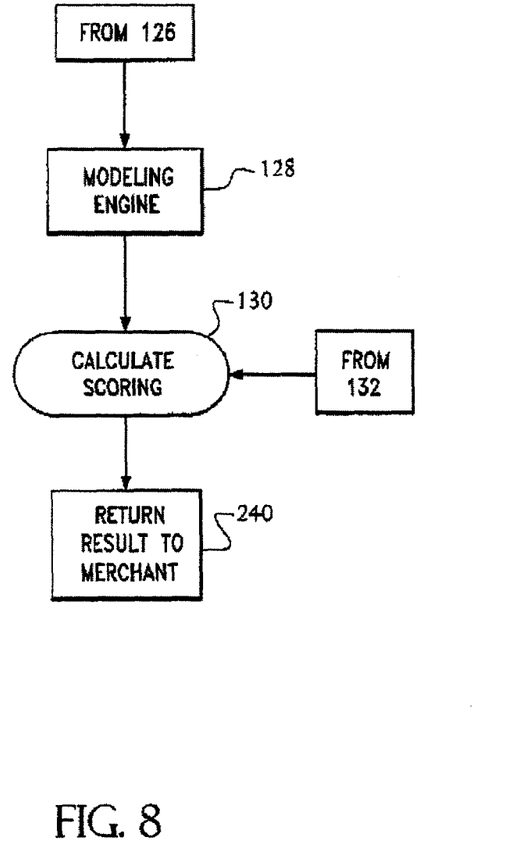
FIG. 8 is a flow chart of the modeling engine and scoring calculation procedure in accordance with the present invention.

If a mixed or no match result 238 is returned, such as could be the case of the artificial intelligence modeling, the procedure proceeds to the modeling engine 128 to determine whether elements exist within the demographic data follow the same or inverse trends of fraud percentages are indicated by the transaction.

Demographic Data Checking Procedure

Turning now to FIG. 8, if a mixed or no match result is returned by the fraud pattern recognition portion 126 of the procedure, the modeling engine 128 is enacted. The modeling engine 128 permits the system to check the demographic data associated with the data obtained from the transaction to broaden the effective use of the historical transaction data to determine whether the transaction is potentially fraudulent. A demographic database is consulted which contains over six hundred variables sorted by a ZIP+4 and includes items such as: median family size, median family age, income, education, ethnic background, job classification, commute distances, and buying habits.

The ZIP+4 data for the transaction addresses are compared in step 128 to the demographic data present in a demographic database to determine the relative risk of the transaction. For example, the relative distance of the buyer is "bill-to" address to the "ship-to" address, as adjusted by the population density, could indicate the likelihood of fraud.

As a further example, in a fairly dense population (e.g., Westchester, N.Y.), the typical purchaser does the majority of their shipping within 20 miles of their home. In addition, retail clerks typically are poorly paid, live within 20 miles of their place of employment, and are often involved in retail fraud. If it is assumed that the shipment is to an address other than the cardholder and within 40 miles of the merchant, it is far more likely to be fraudulent than if the shipping distance was more than 40 miles away.

Similarly the country of origin of the transaction credit card could also indicate the likelihood of fraud. For example, some countries have no laws against international fraud and others do not effectively enforce the laws they do have.

In addition, the propensity for overnight shipment versus the request for ground shipment, the time of the day and the day of the week that the order is placed vs. the prevailing fraud rates, and the ease of resale of ordered merchandise (a computer notebook is much easier to fence than a barbeque grill) could also be indicative.

Similarly, the demographic data might show the ZIP+4 for the transaction addresses indicate that a certain percentage of the population in that zip code have at least some college background, which typically indicates an increase level of fraud or that a certain population present in the zip code have a laborer work class certification which indicates a decreased level of fraud.

In addition, the demographic data can be boosted (i.e., ordering the elements within demographic database) so that the greatest portion of a score is determined by the data with the closest commonality with the historical data and the greatest range of change which could be used to modify the results obtained by the modeling engine 128. Boosting is an enhancement to traditional artificial intelligence techniques. In developing a set of rules for the artificial intelligence algorithm to follow, the rules are tested against actual results to see how well the rules work. In contrast, boosting takes the transactions where the rules do not work and assigns them additional weight and the rule development process is repeated. Through boosting, the artificial intelligence refines the rules by learning from the mistakes. For example, if comparing the results of testing median income level by nine digit zip code where the range of head of household average age varies from 38 to 43 years old indicated no causal relationship due to the lack of range, changing the variable to average household income, which ranges from $0 to $150,000 would likely be a better indicator due to its increased range.

Once the modeling portion 128 of the system has been completed or if the pattern recognition portion 126 of the procedure indicated a positive 234 or negative 236 result, the weighted score is calculated 130 and recommended actions are given to the merchant.

In calculating the weighted score, each flag that was set is given a pre-selected weight and a score indicating a potential risk factor. The weight of the flag is a relative value of the specific data when combined with all the data for the transaction, whereas the score is a value of the results of the test of one segment data when compared to the same segment within the historical database. The weighted score returned to the merchant is compared to the merchant's preselected limits to determine what specific actions are recommended based upon the relative risk that a fraudulent transaction has occurred.

For example, a particular weighted score may indicate to a merchant that pre-payment by check and shipment after the check clears is necessary to minimize the risk of fraud and the associated loss attributed thereto. Similarly, a certain weighted score may indicate that shipment can only be made to the billing address of the credit card to reduce the risk of fraud. Alternatively, another weighted score may indicate that the verification call made to the purchaser based on a verified telephone number belonging to the purchaser's address is necessary to minimize the risk of fraud. Lastly, on certain high dollar risk transactions, a particular weighted score may indicate to the merchant that a credit card imprint and signature verification is necessary at the actual shipping location or some other location convenient to the purchaser to complete the order. In this way, the risk of a fraudulent transaction is shifted back to the credit card company.

In this way, the method and system 100 of the present invention can be used by a merchant to limit the potential risks entailed when processing non-personal commerce transactions.

The present invention may be embodied in other specific forms without departing from the spirit or essential attributes thereof and, accordingly, reference should be made to the appended claims, rather than to the foregoing specification, as indicating the scope of the invention.

What is claimed is:

1. Method for detecting fraud in non-personal transactions involving shipment of physical merchandise from a merchant to a potential purchaser, comprising the steps of:
   collecting purchaser data for the transaction, said purchaser data comprising a billing address and a ship-to address;
   storing said purchaser data on a non-transitory computer readable storage medium;
   transmitting said ship-to address to a fraud-detection system;
   processing said ship-to address with a computer processor to determine whether the transaction is potentially fraudulent by checking the purchaser's ship-to address against non-billing address criteria;
   returning the relative risks of fraudulent activity associated with the transaction; and whereby the shipment of the merchandise from the merchant to the purchaser is effected if the relative risks of fraudulent activity associated with the transaction is below the merchant's threshold.

2. The fraud detection method according to claim 1, wherein the processing step comprising parsing out the purchaser's ship-to address.

3. The fraud detection method according to claim 1, wherein the step of checking the purchaser's ship-to address against criteria comprises a step of checking to determine whether the purchaser's ship-to address exists.

4. The fraud detection according to claim 1, wherein the step of checking the purchaser's ship-to address against criteria comprises comparing a zip code of the ship-to address against a post office database.

5. The fraud detection method according to claim 4, wherein the zip code is a ZIP+4 zip code.

6. The fraud detection method according to claim 1, wherein the step of checking the purchaser's ship-to address against criteria comprises comparing the city and state of the ship-to address against the city and state with a ZIP+4 code.

7. The fraud detection method according to claim 1 wherein the step of checking the purchaser's ship-to address against criteria comprises the area code of the purchaser's phone number to determine whether it fits the geographic area of the ship-to address.

8. The fraud detection method according to claim 1, wherein the step of checking the purchaser's ship-to address against criteria comprises comparing the purchaser's ship-to address against the national change of address service database or the publisher's change of address database.

9. The fraud detection method according to claim 1, wherein the step of checking the purchaser's ship-to address against criteria comprises rating a building site associated with the "ship-to" address to determine whether the building or lot type is inconsistent with the transaction data.

10. The fraud detection method according to claim 1, wherein the step of checking the purchaser's ship-to address against criteria further comprises the step of checking the purchaser's ship-to address against an historical database to determine whether a prior history of fraud exists.

11. The fraud detection method according to claim 10, wherein the prior history of fraud determining step comprises checking whether a record associated with the purchaser's ship-to address exists in the historical fraud database.

12. The fraud detection method according to claim 11, wherein the associated record is checked to determine whether negative data is associated with the ship-to address.

13. The fraud detection method according to claim 1, wherein the step of checking the purchaser's ship-to address against criteria further comprises the step of checking the purchaser's ship-to address against an historical database to determine whether a pattern of fraudulent activity exists for the ship-to address.

14. The fraud detection method according to claim 13, wherein the pattern of fraud detecting step comprises determining whether an overlapping use of payment means and ship-to address is present by consulting a database of prior transactions.

15. The fraud detection method according to claim 13, wherein the pattern of fraud detecting step comprises retroactively notifying the merchant of previous transactions associated with the ship-to address once a pattern of fraudulent activity has been detected.

16. The fraud detection method according to claim 1, wherein the step of checking the purchaser's ship-to address against criteria further comprises the step of checking the purchaser's ship-to address against a modeling engine to determine whether elements exist in the demographic data which correlate with fraudulent trends.

17. The fraud detection method according to claim 1, wherein the step of checking the purchaser's ship-to address against criteria further comprises the step of calculating a score based at least in part upon the likelihood that the transaction is fraudulent.

18. A system for detecting fraud in a non-personal environment involving shipment of physical merchandise from a merchant to a potential purchaser and, comprising:

a non-transitory computer usable medium having computer readable program code embedded therein, when executed by a computer, causes the computer to detect fraud in a non-personal environment involving a potential purchaser and a merchant, the computer usable medium comprising:

computer readable program code for collecting purchaser data for a transaction, said purchaser data comprising a billing address and a ship-to address;

computer readable program code for transmitting said ship-to address to a fraud-detection system;

computer readable program code for processing said ship-to address to determine whether the transaction is potentially fraudulent by checking the purchaser's ship-to address against non-billing address criteria; and computer readable program code for returning the relative risks of fraudulent activity associated with the transaction, and whereby the shipment of the merchandise from the merchant to the purchaser is effected if the fraud detection system indicates that the relative risks of fraudulent activity associated with the transaction is below the merchant's threshold.

19. A method for detecting fraud in a non-personal environment involving shipment of physical merchandise from a merchant to a potential purchaser, comprising the steps of:

receiving and storing identity data of the potential purchaser on a non-transitory computer readable storage medium for processing interactively and in real-time on a computer, the identity data comprising a 'ship to' address of the potential purchaser;

parsing the 'ship to' address to postal standards with the computer processor and comparing the 'ship to' address against a Coding Accuracy Support System (CASS) to determine whether the 'ship to' address is a structurally viable and a deliverable address;

automatically prompting the purchaser to correct the 'ship to' address using a computer interface of the computer processor if the 'ship to' address is determined to be an unidentifiable addresses;

evaluating the results of the parsing and correcting steps to establish the relative risks of fraudulent activity associated with the transaction; and wherein the shipment of the merchandise from the merchant to the purchaser is effected if the relative risks of fraudulent activity associated with the transaction is below the merchant's threshold.

20. The fraud detection method according to claim 19, wherein the step of checking the potential purchaser's 'ship-to' address further comprises checking to determine whether the potential purchaser's 'ship-to' address exists in the real world and modifying the likelihood that the transaction is fraudulent based on the results.

21. The fraud detection method according to claim 19 wherein the step of checking the potential purchaser's 'ship-to' address further comprises comparing a zip code of the 'ship-to address' against a post office database and comparing the city and state of the 'ship-to' address against a city and state represented by a ZIP+4 code and modifying the likelihood that the transaction is fraudulent based on the results.

22. The fraud detection method according to claim 19, wherein the identity data further comprises the potential purchaser's area code and the 'ship-to' address checking step comprises checking the area code to determine whether the area code fits the geographic area of the purchaser's 'ship-to' address and modifying the likelihood that the transaction is fraudulent based on the results.

23. The fraud detection method according to claim 19, wherein the step of checking the potential purchaser's 'ship-to' address further comprises comparing a 'bill-to' address against a change of address service database and modifying the likelihood that the transaction is fraudulent based on the results.

24. The fraud detection method according to claim 19, wherein the step of checking the potential purchaser's 'ship-to' address comprises rating a building site associated with the 'ship-to' address to determine whether the building or lot type is consistent with the transaction data and modifying the likelihood that the transaction is fraudulent based on the results.

25. The fraud detection method according to claim 19, wherein the step of checking the potential purchaser's 'ship-to' address further comprises checking the 'ship-to' address against an historical database to determine whether a prior history of fraud exists at the 'ship-to' address is and modifying the likelihood that the transaction is fraudulent based on the results.

26. The fraud detection method according to claim 25, wherein the step of checking the potential purchaser's 'ship-to' address further comprises checking a 'bill-to' address against an historical database to determine whether a prior history of fraudulent activity exists for the 'bill-to' address and modifying the likelihood that the transaction is fraudulent based on the results.

27. The fraud detection method according to claim 19, wherein the pattern of fraud detecting step further comprises determining whether an overlapping use of ship-to addresses and payment means is present by consulting a database of recent prior transactions creating interlocking concurrent shipments to two or more addresses with three or more payment means, within a short period of time and the likelihood that the transaction is fraudulent based on the results.

28. The fraud detection method according to claim 27, wherein the pattern of fraud detecting step further comprises retroactively notifying merchants of previous transactions associated with the 'ship-to' address once a pattern of potential fraudulent activity has been detected, and modifying the likelihood that the transaction is fraudulent based on the results.

29. The fraud detection method according to claim 19, further comprising the step of checking the 'ship-to' address against a modeling engine to determine whether elements exist in the demographic data which correlate with recent fraud trends, and modifying the likelihood that the transaction is fraudulent based on the results.

30. A system for detecting fraud in a non-personal environment involving a potential purchaser and a merchant, comprising:

a non-transitory computer usable medium having computer readable program code embedded therein, when executed by a computer to detect fraud in a non-personal environment involving a potential purchaser and a merchant, the computer usable medium comprising:

computer readable program code for receiving and storing identity data of the potential purchaser for processing interactively and in real-time, the identity data comprising a 'ship to' address of the potential purchaser;

computer readable program code for parsing the 'ship to' address to postal standards with the computer processor and comparing the 'ship to' address against a Coding Accuracy Support System (CASS) to determine whether the 'ship to' address is a structurally viable and a deliverable address;

computer readable program code for automatically prompting the merchant to correct the 'ship to' address using a computer interface of the computer processor if the 'ship to' address is determined to be an unidentifiable addresses; and computer readable program code for evaluating the results of the parsing and correcting steps to establish the relative risks of fraudulent activity associated with the transaction; and whereby the shipment of the merchandise from the merchant to the purchaser is effected if the fraud detection system indicates that the relative risks of fraudulent activity associated with the transaction is below the merchant's threshold.

* * * * *

UNITED STATES PATENT AND TRADEMARK OFFICE
CERTIFICATE OF CORRECTION

| | | |
|---|---|---|
| PATENT NO. | : 8,073,785 B1 | Page 1 of 1 |
| APPLICATION NO. | : 09/710776 | |
| DATED | : December 6, 2011 | |
| INVENTOR(S) | : George J. Candella, Ireene H. Hohavec and Michael L. Scruggs | |

It is certified that error appears in the above-identified patent and that said Letters Patent is hereby corrected as shown below:

Title page Item (60) should read (60) Provisional Application No. 60/164,444, filed on November 9, 1999.

Signed and Sealed this

Thirteenth Day of March, 2012

David J. Kappos
*Director of the United States Patent and Trademark Office*